(12) United States Patent
Shen et al.

(10) Patent No.: US 12,465,569 B2
(45) Date of Patent: Nov. 11, 2025

(54) MICROPARTICLE FORMULATIONS FOR INTRAVENOUS THERAPY AND METHODS FOR THEIR MANUFACTURE AND USE

(71) Applicant: The Methodist Hospital, Houston, TX (US)

(72) Inventors: Haifa Shen, Bellaire, TX (US); Mauro Ferrari, Houston, TX (US); Zhenhua Hu, Houston, TX (US); Guodong Zhang, Sugar Land, TX (US)

(73) Assignee: The Methodist Hospital, Houston, TX (US)

( * ) Notice: Subject to any disclaimer, the term of this patent is extended or adjusted under 35 U.S.C. 154(b) by 0 days.

(21) Appl. No.: 18/980,349

(22) Filed: Dec. 13, 2024

(65) Prior Publication Data
US 2025/0108010 A1    Apr. 3, 2025

Related U.S. Application Data

(63) Continuation of application No. PCT/US2023/033625, filed on Sep. 25, 2023.

(60) Provisional application No. 63/409,935, filed on Sep. 26, 2022.

(51) Int. Cl.
| | |
|---|---|
| *A61K 9/00* | (2006.01) |
| *A61K 9/16* | (2006.01) |
| *A61K 47/10* | (2017.01) |
| *A61K 47/26* | (2006.01) |
| *A61K 47/50* | (2017.01) |
| *A61K 47/59* | (2017.01) |
| *A61P 31/00* | (2006.01) |

(52) U.S. Cl.
CPC .......... *A61K 9/1652* (2013.01); *A61K 9/0019* (2013.01); *A61K 9/1641* (2013.01); *A61K 9/1694* (2013.01); *A61K 47/593* (2017.08)

(58) Field of Classification Search
None
See application file for complete search history.

(56) References Cited

U.S. PATENT DOCUMENTS

| | | | | |
|---|---|---|---|---|
| 6,551,619 | B1 * | 4/2003 | Penkler | A61K 9/1617 |
| | | | | 514/975 |
| 9,446,135 | B2 * | 9/2016 | Sun | A61K 9/5089 |
| 2004/0013728 | A1 * | 1/2004 | Oh | A61K 47/6927 |
| | | | | 424/468 |
| 2020/0247838 | A1 * | 8/2020 | Ge | C07J 1/0011 |

OTHER PUBLICATIONS

Xu et al. (Nat Biotechnol. 2016;34(4):18 pages). (Year: 2016).*
Gao et al. (International Journal of Nanomedicine 2014:9 3425-3437) (Year: 2014).*
Venuta et al. (J Mater Chem B Mater Biol Med 2017;5(2):207-209) (Year: 2017).*

* cited by examiner

*Primary Examiner* — Ernst V Arnold
(74) *Attorney, Agent, or Firm* — William R. Childs; Childs Patent Law PLLC

(57) ABSTRACT

The present disclosure provides methods and formulations for therapeutic microparticles, wherein formulations are used for administering therapeutic microparticles to subjects by way of intravenous injection. Also, provided are methods of administering therapeutic microparticles to subjects in need thereof. The formulations provide stability and prevent settling and clumping of therapeutic microparticles in solution up to 3 hours.

14 Claims, 2 Drawing Sheets

MICROPARTICLE FORMULATIONS FOR INTRAVENOUS THERAPY AND METHODS FOR THEIR MANUFACTURE AND USE

CROSS-REFERENCE TO RELATED APPLICATIONS

This Application is a continuation and claims priority to PCT Application No. PCT/US2023/033625, filed on Sep. 25, 2023, which claims priority to U.S. Provisional Application No. 63/409,935, filed on Sep. 26, 2022, the entirety of which are incorporated by reference.

GOVERNMENT SUPPORT

This invention was made with Government support under W81XWH-12-1-0414 and W81XWH-17-1-0389 awarded by the Department of Defense. The Government has certain rights in the invention.

TECHNICAL FIELD

The present disclosure relates generally to the field of pharmacology. In particular, the present disclosure provides formulations for suspending therapeutic microparticles and methods of making and using the same. The formulations can allow for therapeutic microparticles to be administered to subjects by way of intravenous infusion. The present disclosure also provides methods of administering therapeutic microparticles to subjects in need thereof.

BACKGROUND

Intravenous therapy is a medical technique that administers fluids, medications, and nutrients directly into the circulatory system of a patient. Intravenous therapy is one of the most common and medically accepted systems for administering an active agent or drug to a patient. This method of administering drugs and fluids can be critical in situations wherein the drug must be administered to someone who is unconscious or unable to swallow. Intravenous therapy is considered the fastest method of administering a medicine to a patient. Intravenous therapy also allows for medical practitioners to control the rate at which an active ingredient is administered over time by simply controlling the rate at which an intravenous (IV) drip is allowed to enter the patient's circulatory system. Also, there are many therapeutic agents for which intravenous (IV) therapy is the only or preferred method of administering a given therapeutic agent, especially in the field of nanomedicine.

Because intravenous therapy administers active agents directly into the circulatory system of a subject, a major challenge for intravenous therapy can be ensuring that an active agent does not settle or form clumps before, during, or after injection into the veins and arteries of a patient. Even the slightest aggregation within a patient's veins can lead to blood clotting, blockage of arteries, strokes, and heart failure. In practice, most IV formulations will typically be made by a pharmacist before being set up for intravenous administration to a patient. Considering practical working conditions within a hospital or pharmacy as well as a standard range of IV drip rates, an active agent need to stay suspended for at least 30 minutes.

There is a need for formulations that are compatible with intravenous administration into the body of a patient. There is a need for formulations and that are capable of keeping therapeutic microparticles in suspension for 30 minutes or more.

SUMMARY

The present disclosure provides a formulation for intravenous injection. The formulation for intravenous injection comprises from about 0.80 weight percent to about 1.60 weight percent of sodium carboxymethyl cellulose based on a total weight of the formulation, from about 0.12 weight percent to about 0.28 weight percent of poly(ethylene glycol)-block-poly(propylene glycol)-block-poly(ethylene glycol) polymer based on the total weight of the formulation, from about 0.22 weight percent to about 0.78 weight percent of mannitol based on the total weight of the formulation, and water.

In some embodiments, the formulation contains from about 1.19 weight percent to about 1.54 weight percent of sodium carboxymethyl cellulose based on the total weight of the formulation or about 1.33 weight percent to about 1.47 weight percent of sodium carboxymethyl cellulose based on the total weight of the formulation. In some embodiments, the formulation contains from about 0.19 weight percent to about 0.21 weight percent of poly(ethylene glycol)-block-poly(propylene glycol)-block-poly(ethylene glycol) polymer based on the total weight of the formulation. In some embodiments, the poly(ethylene glycol)-block-poly(propylene glycol)-block-poly(ethylene glycol) has a weight average molecule weight of about 8,400 Daltons. In an embodiment, the poly(ethylene glycol)-block-poly(propylene glycol)-block-poly(ethylene glycol) has a structure of Formula I,

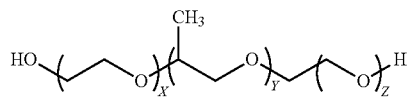

wherein X is from 72 to 88, Y is from 23 to 30, and Z is from 72 to 88.

In some embodiments, the formulation contains from about 0.48 weight percent to about 0.66 weight percent of mannitol or from about 0.49 weight percent to about 0.63 weight percent of mannitol based on the total weight of the formulation. In some embodiments, the formulation further comprises therapeutic microparticles. In some embodiments, the therapeutic microparticles include an active agent, a polymeric active agent conjugate, or a combination thereof. In some embodiments, the polymer active agent conjugate includes a polymeric carrier conjugated to the active agent. In some embodiments, the formulation contains from about 0.5 billion therapeutic microparticles per milliliter of the formulation to about 3.0 billion therapeutic microparticles per milliliter of the formulation. In some embodiments, the formulation contains from about 1.0 billion therapeutic microparticles per milliliter of the formulation to about 2.5 billion therapeutic microparticles per milliliter of the formulation. In an embodiment, the therapeutic microparticles have a longest dimension of about 1,700 nm to about 3,000 nm, a shortest dimension of about 100 nm to about 200 nm, or a combination thereof. In some embodiments, the therapeutic microparticles have a discoidal shape having a diameter of from about 900 nm to about 2,800 nm and a thickness of from about 200 nm to about 800 nm. In some embodiments, the polymeric carrier comprises poly-L-glutamic acid, poly(lactic acid), poly(glycolic acid), poly(D-lactic-co-glycolic acid), poly(L-lactic-co-glycolic acid), poly(D,L-lactic-co-glycolic acid), poly(caprolactone), poly(valerolactone), poly(hydroxybutyrate), poly(hydrovalerate), polydioxnanone, and combinations thereof. In some embodiments, the active agent includes: a drug, a biologically active compound, a chemotherapeutic agent, an immunosuppressive agent, a cytokine, a cytotoxic agent, a nucleolytic compound, a contrast agent, a pro-drug enzyme, a gene, a nucleic acid, a shRNA, a siRNA, a DNA fragment, a RNA fragment, a plasmid, or any combinations thereof. In some embodiments, the therapeutic microparticles are porous silicon microparticles containing a polymer of L glutamic acid conjugated with doxorubicin, said polymer having a weight average molecular weight of from about 50 kDa to about 100 kDA, including from about 70 kDa to about 80 kDa.

The present disclosure further provides methods of preparing a formulation for intravenous injection. In some embodiments, the method comprises forming the formulation by adding sodium carboxymethyl cellulose, a poly(ethylene glycol)-block-poly(propylene glycol)-block-poly(ethylene glycol), and mannitol to water, simultaneously or in any order. In some embodiments, the formulation contains from about 0.80 weight percent to about 1.60 weight percent sodium carboxymethyl cellulose based on a total weight of the formulation, from about 0.12 weight percent to about 0.28 weight percent of the poly(ethylene glycol)-block-poly(propylene glycol)-block-poly(ethylene glycol) based on the total weight of the formulation, and from about 0.22 weight percent to about 0.78 weight percent of mannitol based on the total weight of the formulation. In some embodiments, the method further comprises forming a pharmaceutical formulation by adding therapeutic microparticles to the formulation, the therapeutic microparticles including porous silicon microparticles containing polymeric doxorubicin or porous silicon microparticles containing siRNA. In some embodiments, the method further comprises forming a pharmaceutical formulation by adding therapeutic microparticles to the formulation, the therapeutic microparticles including porous silicon microparticles containing an active agent, a polymeric active agent conjugate, or a combination thereof. In some embodiments, the polymer active agent conjugate includes a polymeric carrier conjugated to the active agent. In some embodiments, the method further comprises forming a pharmaceutical formulation by adding therapeutic microparticles to the formulation, the therapeutic microparticles being porous silicon microparticles containing a polymer of L glutamic acid conjugated with doxorubicin, the polymer having a weight average molecular weight of from about 50 kDa to about 100 kDA, including from about 70 kDa to about 80 kDa. In some embodiments, the polymeric carrier comprises poly-L-glutamic acid, poly(lactic acid), poly(glycolic acid), poly(D-lactic-co-glycolic acid), poly(L-lactic-co-glycolic acid), poly(D,L-lactic-co-glycolic acid), poly(caprolactone), poly(valerolactone), poly(hydroxybutyrate), poly(hydrovalerate), polydioxnanone, or combinations thereof. In some embodiments, the active agent includes: a drug, a biologically active compound, a chemotherapeutic agent, an immunosuppressive agent, a cytokine, a cytotoxic agent, a nucleolytic compound, a contrast agent, a pro-drug enzyme, a gene, a nucleic acid, a shRNA, a siRNA, a DNA fragment, a RNA fragment, a plasmid, or any combinations thereof. In some embodiments, the method further comprises forming a pharmaceutical formulation by adding therapeutic microparticles to the formulation before, during, or after, adding the sodium carboxymethyl cellulose, the poly(ethylene glycol)-block-poly(propylene glycol)-block-poly(ethylene glycol), or the mannitol to water. In some embodiments, the method further comprises, before forming a pharmaceutical formulation by adding therapeutic microparticles to the formulation, the therapeutic microparticles being the porous silicon microparticles containing the polymer of L-glutamic acid conjugated with doxorubicin, forming a suspension of the therapeutic microparticles, wherein forming the suspension of the therapeutic microparticles comprises: forming a doxorubicin solution by dissolving poly(L-glutamic acid) polymer conjugated with doxorubicin in a liquid, the liquid containing from about 50 weight percent to 100 weight percent methanol based on a total weight of the doxorubicin solution, and forming therapeutic microparticles by contacting porous silicon microparticles with the doxorubicin solution. In some embodiments, the method further comprises: after forming the suspension of pharmaceutical particles, and before forming the pharmaceutical formulation, removing a supernatant by applying centrifugal force to the doxorubicin solution and separating the supernatant from a volume of the doxorubicin solution.

In some embodiments, the method further comprises: after forming the suspension of pharmaceutical particles, and before forming the pharmaceutical formulation, agitating the doxorubicin solution by applying vibrations, ultrasonic sound, or a combination thereof.

The present disclosure further provides a method of administering a therapeutic microparticle to a subject in need thereof. In some embodiments, the method of administering the therapeutic microparticle to the subject comprising: providing a pharmaceutical formulation, the pharmaceutical formulation containing from about 0.80 weight percent to about 1.60 weight percent sodium carboxymethyl cellulose based on a total weight of the formulation, from about 0.12 weight percent to about 0.28 weight percent of a poly(ethylene glycol)-block-poly(propylene glycol)-block-poly(ethylene glycol) polymer based on the total weight of the formulation, from about 0.22 weight percent to about 0.78 weight percent of mannitol based on the total weight of the formulation, therapeutic microparticles, and water, adding the pharmaceutical formulation into an intravenous vessel, and connecting the intravenous vessel to the subject. In some embodiments, the therapeutic microparticles include an active agent, a polymeric active agent conjugate, or a combination thereof, the polymer active agent conjugate including a polymeric carrier conjugated to the active agent. In some embodiments, the pharmaceutical formulation contains from about 0.5 billion therapeutic microparticles per milliliter to about 3.0 billion therapeutic microparticles per milliliter of the pharmaceutical formulation.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Figure 1A:
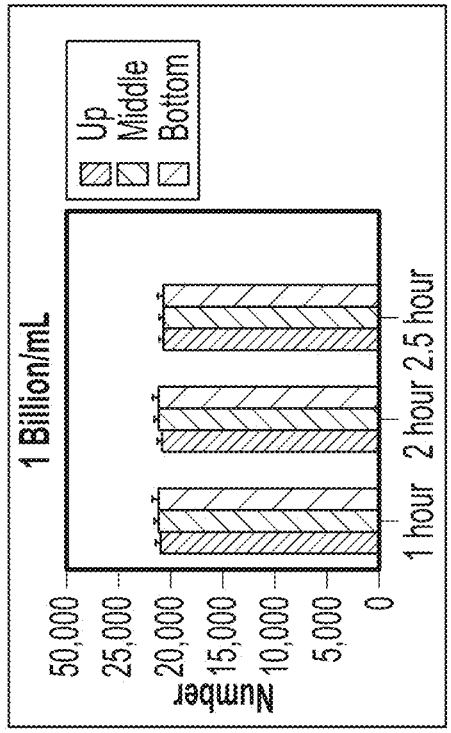
FIGS. 1A-1D is a graph that shows the effect of rotation on the suspension time of therapeutic microparticles (pDox) in an embodiment of the formulation.
Figure 1B:
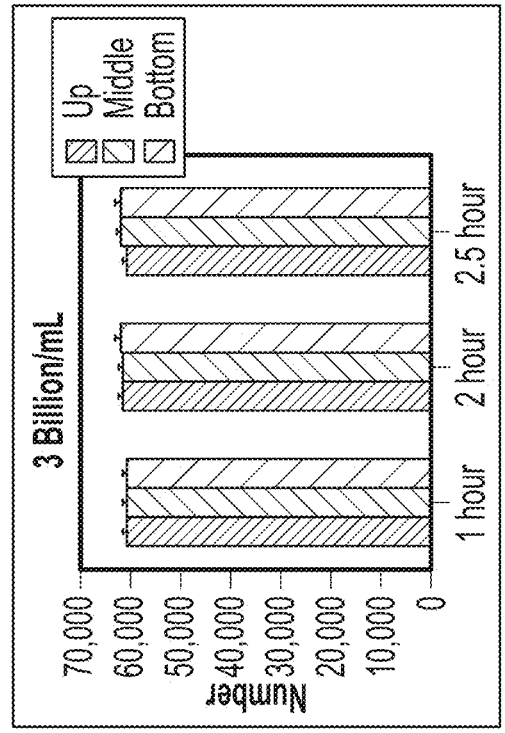
Figure 1C:
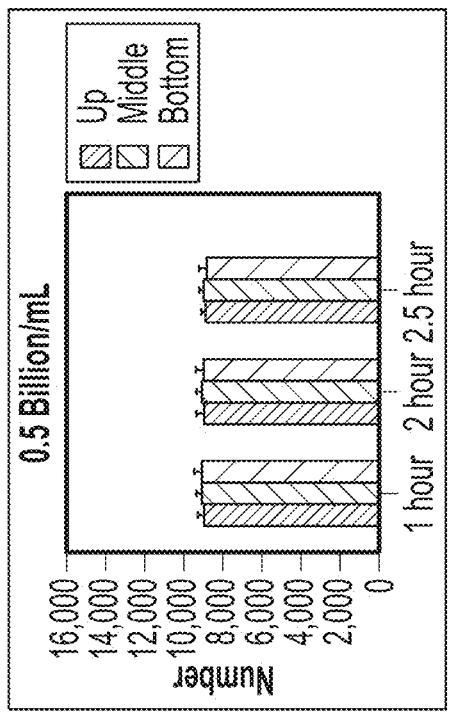
Figure 1D:
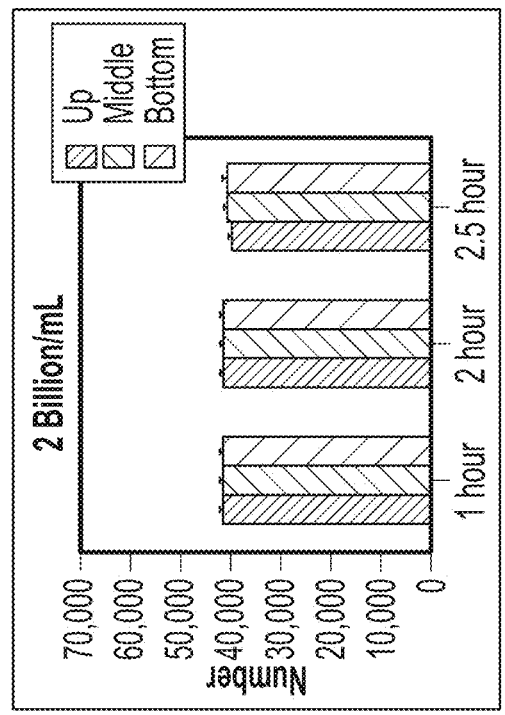

Unless otherwise noted, all measurements are in standard metric units.

Unless otherwise noted, all instances of the words "a," "an," or "the" can refer to one or more than one of the word that they modify.

Unless otherwise noted, the term "about" refers to ±10% of the non-percentage number that is described, rounded to the nearest number to the accuracy shown. For example, about 105.3 mm, would include 94.8 to 115.8 mm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 100 mm to about 200 mm would include from 90 mm to 220 mm.

Unless otherwise noted, when a range of numbers refers to numbers that are easily and routinely varied in a laboratory setting, such as weight, mass, concentration, temperature, or pressure, then the range of numbers or measurements includes all numbers in that range. For example, the range of 0.80 wt % to 1.60 wt % includes 0.9, 0.95, 1.0, 1.1, 1.2, 1.25, 1.5, 1.59 and any sub range therein.

Unless otherwise noted, the term "for example" or "e.g.," as used herein, is used merely by way of example, and should not be construed as limiting the present disclosure to only those items explicitly referred to in the specification.

Unless otherwise noted, the term "microparticle" means a particle having a size between 0.1 micron and 100 microns.

Unless otherwise noted, "micron" means "micrometer" and the term "microns" means "micrometers." These terms are interchangeable.

As used herein, the term "subject" (also interchangeably referred to as "host" or "patient") refers to any subject that can receive one or more of the pharmaceutical formulation disclosed herein. In some embodiments, the subject is a vertebrate animal, which is intended to denote any animal species, including a mammalian species such as a human being. In certain embodiments, a "subject" refers to any animal host including, without limitation, any mammalian host, including a human being. In some embodiments, the term refers to any mammalian host, the latter including but not limited to, human and non-human primates, bovines, canines, caprines, cavines, corvines, epines, equines, felines, hircines, lapines, leporines, lupines, murines, ovines, porcines, ranines, racines, vulpines, and the like, including livestock, zoological specimens, exotics, as well as companion animals, pets, and any animal under the care of a veterinary practitioner. Mammalian species that can benefit from the disclosed methods include, but are not limited to, humans, non-human primates such as apes; chimpanzees; monkeys, and orangutans, domesticated animals, including dogs and cats, as well as livestock such as horses, cattle, pigs, sheep, and goats, or other mammalian species including, without limitation, mice, rats, guinea pigs, rabbits, hamsters, and the like. A subject can be of any age at which the patient is able to respond to inoculation with the drug or vaccine by generating an immune response. In particular embodiments, the mammalian patient is a human.

Unless otherwise noted, the term "naturally occurring" as used herein as applied to an object refers to the fact that an object can be found in nature.

Unless otherwise noted, the term "non-naturally occurring" as used herein when applied to an object refers to an object having a structure, composition, or combination thereof, that was made by human action and cannot or has not been found in nature without human intervention. For example, a polypeptide found in nature having a structure that has been modified in a laboratory would be a non-naturally occurring polypeptide.

Unless otherwise noted, as used herein, the term "polypeptide" is intended to encompass a singular "polypeptide" as well as plural "polypeptides," and includes any chain or chains of two or more amino acids. Thus, as used herein, terms including, but not limited to "peptide," "dipeptide," "tripeptide," "protein," "enzyme," "amino acid chain," and "contiguous amino acid sequence" are all encompassed within the definition of a "polypeptide," and the term "polypeptide" can be used instead of, or interchangeably with, any of these terms. The term further includes polypeptides that have undergone one or more post-translational modification(s), including for example, but not limited to, glycosylation, acetylation, phosphorylation, amidation, derivatization, proteolytic cleavage, post-translation processing, or modification by inclusion of one or more non-naturally occurring amino acids.

Unless otherwise noted, conventional nomenclature in the art for polynucleotide and polypeptide structures is adopted herein. For example, one-letter and three-letter abbreviations are widely employed to describe amino acids: Alanine (A; Ala), Arginine (R; Arg), Asparagine (N; Asn), Aspartic Acid (D; Asp), Cysteine (C; Cys), Glutamine (Q; Gln), Glutamic Acid (E; Glu), Glycine (G; Gly), Histidine (H; His), Isoleucine (I; Leucine (L; Leu), Methionine (M; Met), Phenylalanine (F; Phe), Proline (P; Pro), Serine (S; Ser), Threonine (T; Thr), Tryptophan (W; Trp), Tyrosine (Y; Tyr), Valine (V; Val), and Lysine (K; Lys). Amino acid residues described herein are preferred to be in the "L" isomeric form. However, residues in the "D" isomeric form may be substituted for any L-amino acid residue provided the desired properties of the polypeptide are retained.

Unless otherwise noted, the term "sequence," when referring to amino acids, relates to all or a portion of the linear N-terminal to C-terminal order of amino acids within a given amino acid chain, e.g., polypeptide or protein; "subsequence" means any consecutive stretch of amino acids within a sequence, e.g., at least 3 consecutive amino acids within a given protein or polypeptide sequence. With reference to nucleotide chains, "sequence" and "subsequence" have similar meanings relating to the 5' to 3' order of nucleotides.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, all reactions, procedures, and formulations were or can be performed under normal temperature and pressure, namely 20° C. and 1 atmosphere.

Unless otherwise noted, properties (height, width, length, ratio etc.) as described herein are understood to be averaged measurements.

There is a revolution going on in the field of nanomedicine. Researchers are inventing more and more ways to design and fabricate micro and nanoscale platforms for administering active agents, such as drugs and biomaterials. However, for nanomedicine to be adopted into practical use in the modern medical setting, then ways must be found to adapt types of nanomedicine, such as therapeutic microparticles, into the existing and accepted of modern medicine. The application of therapeutic microparticles has always faced a challenge and that challenge is that care must be taken to ensure that these therapeutic microparticles do not aggregate and settle in solution before they can be of use. Nowhere is that challenge greater than when adapting therapeutic microparticles for use in the modern and common treatment of intravenous therapy or intravenous administration of therapeutic agents. If the therapeutic agents clump or settle before or during IV administration, then the patient could suffer injury or death.

In practice, most IV formulations are manufactured by a pharmacist at a hospital or lab. Then, realistically, the IV formulation may have to wait for 30 minutes to an hour before it can be picked up a healthcare worker and transported to the patient. Once to the patient, the IV formulation will typically be administered by pump or gravity at a rate set by the health care worker. Depending on the wait and rate, the IV formulation may have to wait 60 minutes to 90 minutes before the entire formulation can be injected into the patient's veins. Of course, no healthcare worker or hospital administrator wants to take the risk of the therapeutic agents clumping or settling right at the upper limit of 90 minutes. Especially, when the patient could suffer injury or death. The longer an IV formulation can keep the therapeutic microparticles in safely suspended in solution, the better, safer, and more quickly adopted the IV formulation and methods of using, it will be.

If all of that wasn't challenging enough, pharmacists cannot use just any ingredients to make an IV formulation. Instead, they can only use those compounds and liquids which have been FDA (Food and Drug Administration) approved for use in IV formulations.

Also, because the goal is an IV formulation, not just any microparticles can be used as a platform for hosting therapeutic agents. For example, if the microparticles are too large or the shapes too jagged, the therapeutic microparticles would more likely to cause damage when entering a patient's body. Conversely, if the microparticles for hosting therapeutic agents are too small, then they might cause unpredictable side effects, such as bypassing the blood brain barrier.

It has been discovered that the IV formulation of the present disclosure can satisfy all of these challenges by providing an IV formulation that can stably suspend therapeutic microparticles for times, including 105 minutes and 2.5 hours, using only compounds and liquids that are FDA approved for IV formulations. Moreover, it has been found that there are specific concentrations of the compounds and liquids in the IV formulation disclosed herein that can provide this stability, and that those outside of these ranges tend to fall out of suspension much faster. Next, it has been discovered that this formulation is compatible with therapeutic microparticles, wherein the underlying characteristics of the microparticles, such as size and shape distribution can be controlled my microfabrication. It has also been discovered that this formulation is compatible with therapeutic microparticles, wherein the therapeutic agent itself is varies, such that the IV formulation should be compatible stabilizing a wide range of therapeutic microparticles, regardless of the particular therapeutic agent hosted in the microparticles.

The present disclosure provides a formulation for intravenous injection. In some embodiments, the formulation for intravenous injection comprises from about 0.80 weight percent to about 1.60 weight percent of sodium carboxymethyl cellulose based on a total weight of the formulation. In some embodiments, the formulation comprises from about 0.12 weight percent to about 0.28 weight percent of poly(ethylene glycol)-block-poly(propylene glycol)-block-poly(ethylene glycol) based on the total weight of the formulation. In some embodiments, the formulation comprises from about 0.22 weight percent to about 0.78 weight percent of mannitol based on the total weight of the formulation, and water.

In some embodiments, the formulation contains from about 1.19 weight percent to about 1.54 weight percent of sodium carboxymethyl cellulose based on the total weight of the formulation. In some embodiments, the formulation contains from about 1.33 weight percent to about 1.47 weight percent of sodium carboxymethyl cellulose based on the total weight of the formulation. In some embodiments, the formulation contains from about 0.90 weight percent to about 1.5 weight percent of sodium carboxymethyl, including from about 1.0 weight percent to about 1.45 weight percent or from about 1.0 weight percent to about 1.35 weight percent. It has been found that when the formulation exceeds about 1.60 weight percent of sodium carboxymethyl cellulose based on a total weight of the formulation, then the formulation becomes incapable of suspending therapeutic microparticles more than 90 minutes. It has been found that when the formulation passes below about 0.80 weight percent of sodium carboxymethyl cellulose based on a total weight of the formulation, then the formulation becomes incapable of suspending therapeutic microparticles more than 90 minutes.

In some embodiments, the formulation contains from about 0.19 weight percent to about 0.21 weight percent of poly(ethylene glycol)-block-poly(propylene glycol)-block-poly(ethylene glycol) based on the total weight of the formulation. In some embodiments, the formulation contains poly(ethylene glycol)-block-poly(propylene glycol)-block-poly(ethylene glycol) in an amount from about 0.13 weight percent to about 0.26 weight percent. In some embodiments, the formulation contains poly(ethylene glycol)-block-poly(propylene glycol)-block-poly(ethylene glycol) in an amount from about 0.14 weight percent to about 0.25 weight percent, including from about 0.17 weight percent to about 0.23 weight percent, and including from about 0.18 weight percent to about 0.22 weight percent. It has been found that when the formulation exceeds about 0.21 weight percent of poly(ethylene glycol)-block-poly(propylene glycol)-block-poly(ethylene glycol) based on the total weight of the formulation, then the formulation becomes incapable of suspending therapeutic microparticles more than 90 minutes. It has been found that when the formulation passes below about 0.19 weight percent of poly(ethylene glycol)-block-poly(propylene glycol)-block-poly(ethylene glycol) based on the total weight of the formulation, then the formulation becomes incapable of suspending therapeutic microparticles more than 90 minutes.

In some embodiments, the poly(ethylene glycol)-block-poly(propylene glycol)-block-poly(ethylene glycol) has a weight average molecule weight of about 8,400 Daltons.

In some embodiments, the poly(ethylene glycol)-block-poly(propylene glycol)-block-poly(ethylene glycol) has a structure of Formula I,

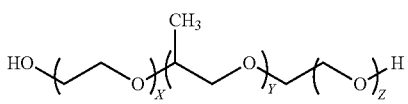

wherein X is from 72 to 88, Y is from 23 to 30, and Z is from 72 to 88. In some embodiments, X is from 75 to 85, including from 78 to 82, Y is from 25 to 28, including from 26 to 28, and Z is from 75 to 85, including from 78 to 82. In some embodiments, the poly(ethylene glycol)-block-poly (propylene glycol)-block-poly(ethylene glycol) is Poloxamer 188 (sometimes called P188) (CAS 9003-11-6), and commercially available from SIGMA-ALDRICH® among others.

In some embodiments, the formulation contains from about 0.48 weight percent to about 0.66 weight percent of mannitol based on the total weight of the formulation. In some embodiments, the formulation contains from about 0.49 weight percent to about 0.63 weight percent of mannitol based on the total weight of the formulation. In some embodiments, the formulation contains mannitol from about 0.28 weight percent to about 0.75 weight percent, including from about 0.30 weight percent to about 0.72 weight percent, or from about 0.35 weight percent to about 0.70 weight percent, or from about 0.40 weight percent to about 0.68 weight percent, or from about 0.45 weight percent to about 0.65 weight percent. It has been discovered that if the amount of mannitol in the formulation exceeds about 0.66 weight percent, then the formulation becomes incapable of suspending therapeutic microparticles more than 90 minutes. It has been discovered that if the amount of mannitol in the formulation exceeds passes below about 0.48 weight percent, then the formulation becomes incapable of suspending therapeutic microparticles more than 90 minutes.

Although the formulation disclosed herein is envisioned as a formulation for suspending therapeutic microparticles in IV formulations, the ingredients of the formulation are stable enough to be shipped and stored for months before any therapeutic microparticles are added. Therefore, in some embodiments, the formulation for intravenous injection may be manufactured and sold without or excluding any microparticles, such as therapeutic microparticles, so that the formulation can be readily available for quick and easy formulation into an IV formulation containing the therapeutic microparticles by simply mixing in the therapeutic microparticles just before needed.

In some embodiments, the formulation further comprises therapeutic microparticles, the therapeutic microparticles including an active agent, a polymeric active agent conjugate, or a combination thereof. The polymer active agent conjugate includes a polymeric carrier conjugated to the active agent.

In some embodiments, the polymeric carrier comprises poly-L-glutamic acid, poly(lactic acid), poly(glycolic acid), poly(D-lactic-co-glycolic acid), poly(L-lactic-co-glycolic acid), poly(D,L-lactic-co-glycolic acid), poly(caprolactone), poly(valerolactone), poly(hydroxybutyrate), poly(hydrovalerate), polydioxnanone, and combinations thereof.

In some embodiments, the active agent includes a drug, a biologically active compound, a chemotherapeutic agent, an immunosuppressive agent, a cytokine, a cytotoxic agent, a nucleolytic compound, a contrast agent, a pro-drug enzyme, a gene, a nucleic acid, a shRNA, a siRNA, a DNA fragment, a RNA fragment, a plasmid, or any combinations thereof. The active agent can be any physiologically or pharmacologically active substance that can produce a desired biological effect. The active agent can be naturally occurring, or produced by synthetic or recombinant methods, or by a combination thereof. A cancer chemotherapy agent can be an active agent. For a more detailed description of anticancer agents and other active agents, those skilled in the art are referred to any number of instructive manuals including, but not limited to, the Physician's Desk Reference and Goodman & Gilman's The Pharmacological Basis of Therapeutics Tenth edition, Hardman, J G et al., (Eds.), McGraw-Hill Professional (2001).

Exemplary drugs include, without limitation, one or more anti-cancer drugs, including the conventional drugs such as camptothecin, docetaxel, temozolomide, carmustine, paclitaxel, gemcitabine, and anthracyclines, including, but not limited to, doxorubicin, liposomal doxorubicin, daunorubicin, and the like, or one or more combinations thereof.

Exemplary chemotherapeutic agent(s) and immunosuppressive agent(s) include, without limitation, 5-fluorouracil (5-FU), 6-mercaptopurine (6-MP), Altretamine, Arsenic trioxide, Asparaginase, Azacitidine, Azathioprine, Bendamustine, Bleomycin, Busulfan, Cabazitaxel, Capecitabine (Xeloda), Carboplatin, Carmustine, Chlorambucil, Cisplatin, Cladribine, Clofarabine, Cyclophosphamide, Cytarabine (Ara-C), Cyclosporine, Dacarbazine, Dactinomycin, Daunorubicin, Decitabine, Dexamethasone, Docetaxel, Doxorubicin (Adriamycin), Doxorubicin liposomal, Epirubicin, Eribulin, Etoposide (VP-16), Floxuridine, Fludarabine, Gemcitabine (Gemzar), Hydroxyurea, Idarubicin, Ifosfamide, Irinotecan, Irinotecan liposomal, Ixabepilone, Lomustine, Mechlorethamine, Melphalan, Methotrexate, Methylprednisolone, Mitomycin-C, Mitotane, Mitoxantrone, Mycophenolate, Nab-paclitaxel, Nelarabine, Omacetaxine, Oxaliplatin, Paclitaxel, Pegaspargase, Pemetrexed (Alimta), Pentostatin, Pralatrexate, Prednisone, Procarbazine, Rapamycin, Romidepsin, Streptozocin, Tacrolimus, Temozolomide, Teniposide, Thioguanine, Thiotepa, tipiracil, Topotecan, Trabectedin, Trifluridine, Valrubicin, Vinblastine, Vincristine, Vincristine liposomal, Vinorelbine, Vorinostat and any combinations thereof.

Exemplary cytokine(s) include, without limitation, lymphokines, monokines, traditional polypeptide hormones and mixtures thereof.

Exemplary cytotoxic agent(s) include, without limitation, Altretamine, trabectedin, busulfan, carmustine, lomustine, doxorubicin, valrubicin, bleomycin, dactinomycin, methotrexate, floxuridine, clofarabine, pralatrexate, vinblastine, vinorelbine, vincristine, vindesine, cisplatin, teniposide, etoposide, topotecan, irinotecan, and any combinations thereof.

Exemplary nucleolytic agent(s) include, without limitation, Dnase I, Exonuclease III, Mung Bean Nuclease, S1 Nuclease, RNAse H, or Rnase A, or can be chemical compounds, such as hydrogen peroxide, osmium tetroxide, hydroxylamine, or potassium permanganate, or can be chemical conditions, such as high or low pH, and any combinations thereof.

Exemplary contrast agent(s) include, without limitation, Gd(III) based agents, Mn(II) based agents and mixtures thereof. The Gd(III) contrast agent includes any Gd(III)-based contrast agent, including, without limitation, gadobenic acid, gadobutrol, gadocoletic acid, gadodenterate, gadodiamide, gadofosveset, gadomelitol, gadopenamide, gadopentetic acid, gadoteric acid, gadoversetamide, gadoxetic acid or a pharmaceutically acceptable salt thereof and mixtures thereof. In another embodiment, the contrast agent can also comprise the Gd(III) ion in a carbon-based particle. For example, the Gd(III)-CA can comprise a gadofullerene or a gadonanotube. Moreover, the gadonanotube can be bundled or unbundled. In some embodiments, the contrast agent is a Mn(II)-based contrast agent (Mn-CA), as known in the art.

In some embodiments, the contrast agent can comprise Magnevist (MAG) and/or Dotarem. In further embodiments, the contrast agents can be pharmaceutically acceptable salts of the above-mentioned contrast agents.

In some embodiments, the porous particle of the present disclosure should have a relatively high porosity to enable loading of the active agent in the pores of the porous particles. In some embodiments, optionally, the porous particles of the present disclosure can be coated with a targeting moiety. Such embodiments can be useful for targeted delivery of the active compound to the desired disease site.

Exemplary biologically active compound(s) include, without limitation, peptides, proteins, therapeutic agents, diagnostic agents, non-biological materials, and combinations thereof. The therapeutic agent can be any physiologically or pharmacologically active substance that can produce a desired biological effect. In some embodiments, the therapeutic agent is a siRNA or a microRNA that silences one or more genes expressed by the cancer cells or the tumor. The therapeutic agent can also be applied to engineer the genome of cancer cells and/or stromal cells in the tumor, such as a CRISPR/Cas9 system. In some embodiments, the therapeutic agent includes, without limitation, one or more proteins, peptides, polypeptides (including, without limitation, enzymes, antibodies, antigens, antigen binding fragments etc.); RNA molecules (including, without limitation, siRNAs, microRNAs, iRNAs, mRNAs, tRNAs, or catalytic RNAs, such as ribozymes, and the like), DNA molecules (including, without limitation, oligonucleotides, polynucleotides, genes, coding sequences (CDS), introns, exons, plasmids, cosmids, phagemids, baculovirus, vectors (including, without limitation, viral vectors, virions, viral particles and such like); peptide nucleic acids, detection agents, imaging agents, contrast agents, detectable gas, radionuclides, or such like, and one or more additional chemotherapeutic agents, surgical intervention (e.g., tumor resection), radiotherapy, and the like, or any combination thereof as part of a multifactorial, or multifocal treatment plan for the affected patient. In some embodiments, it includes anticancer agents, anti-tumorigenic agents, antineoplastic or cytotoxic agents, transcription factors, immunomodulating agents, immuno stimulating agents, neuroactive agents, antiinflammatory agents, chemotherapeutic agents, hormones, so called "trophic factors," chemokines, receptor agonists or antagonists, or such like, or any combination thereof.

Exemplary nucleic acid(s) include, without limitation, polydeoxyribonucleotides (containing 2-deoxy-D-ribose), polyribonucleotides (containing D-ribose), and any other type of polynucleotide that is an N-glycoside of a purine or pyrimidine base, or modified purine or pyrimidine bases (including abasic sites). In some embodiments, it includes polymers of ribonucleosides or deoxyribonucleosides that are covalently bonded, typically by phosphodiester linkages between subunits, but in some cases by phosphorothioates, methylphosphonates, and the like. In some embodiments, it includes single- and double-stranded DNA, as well as single- and double-stranded RNA. Exemplary nucleic acids include, without limitation, gDNA; hnRNA; mRNA; rRNA, tRNA, micro RNA (miRNA), small interfering RNA (siRNA), small nucleolar RNA (snORNA), small nuclear RNA (snRNA), and small temporal RNA (stRNA), and the like, and mixtures thereof.

In some embodiments, the active agent can be selected from the group consisting of genes, nucleic acids, shRNAs, siRNAs, microRNAs, DNA fragments, RNA fragments, plasmids, and combinations thereof. In an illustrative embodiment, the active agent is a siRNA or a microRNA that silences one or more genes expressed by the cancer cells or the tumor. The active agent can also be applied to engineer the genome of cancer cells and/or stromal cells in the tumor, such as a CRISPR/Cas9 system.

In some embodiments, the therapeutic microparticles are porous silicon microparticles housing an active agent, a polymeric active agent conjugate, or a combination thereof. In some embodiments, the polymer active agent conjugate can include a polymeric carrier conjugated to the active agent.

A method of making porous microparticles is disclosed herein. In some embodiments, the method of making porous microparticles can involve providing a substrate, forming a porous layer on a surface of the substrate, patterning one or more microparticles on a substrate and releasing the particles from the substrate, so that an individual released microparticle includes a portion of the porous layer. In some embodiments, the porous layer formation can precede the patterning step, while, in some other embodiments, the porous layer formation can follow the patterning step. In some embodiments, the methods can perform micro/nanofabrication techniques to control the size of the particles formed. Some advantages of using a can be 1) the capability to make particles having a variety of predetermined shapes, including but not limited to, discoidal, spherical, pyramidal, cubic, or rectangular; 2) very precise dimensional control; 3) control over porosity and pore profile; and 4) complex surface modification is possible while all while using conventional and easily adopted methods. In some embodiments, microparticles have pores for loading or internalization.

In some embodiments, the substrate can be composed of any of a number of materials. In some embodiments, the substrate has at least one planar surface, on which one or more particles can be patterned. In some embodiments, the substrate comprises a wet etchable material, i.e. the material that can be made porous by a wet etching technique, such as electrochemical etching.

In certain embodiments, the substrate can be a crystalline substrate, such a wafer, a semiconductor wafer, or a silicon wafer. In certain embodiments, the substrate can be a semiconducting substrate, i.e. a substrate comprising one or more semiconducting materials. Non-limiting examples of semiconducting materials include Ge, GaAs, InP, SiC, GaP, and GaN. In many embodiments, silicon can be the substrate's material. Properties of the substrate, such as doping level, resistivity, and a crystalline orientation of the surface, can be selected to obtain desired size, density, and patterning of pores.

In some embodiments, the porous layer can be formed on the substrate using a number of techniques. In some embodiments, the porous layer is formed using a wet etching technique, i.e. by exposing the substrate to an etching solution that includes at least one etchant, such as a strong acid. In some embodiments, the particular etchant can depend on the material of the substrate. For example, for germanium substrates, such an etchant can be a hydrochloric acid (HCl), while for silicon substrates the etchant can be a hydrofluoric etchant (HF). In some embodiments, the formation of the porous layer is performed using an electrochemical etching process, during which an etching electric current is run through the substrate. Electrochemical etching of silicon substrates to form porous silicon layers is detailed, for example, in Salonen et al., "Mesoporous Silicon in Drug Delivery Applications" *Journal of Pharmaceutical Sciences*, 97(2):632-653(2008). For electrochemical etching of silicon substrates, the etching solution can include, in addition to HF, water, ethanol, or a combination or mixture thereof.

In some embodiments, during the electrochemical etching process, the substrate can act as one of the electrodes. For example, during the electrochemical etching of silicon, the silicon substrate can act as an anode, while a cathode can be an inert metal, such as Platinum (Pt). In such a case, a porous layer is formed on a side of the substrate facing away from the inert metal cathode. In some other embodiments, during the electrochemical etching, the substrate can be placed between two electrodes, which each can comprise an inert metal.

In some embodiments, the electrochemical etching process can be performed in a reactor or a cell resistant to the etchant. For example, when the etchant is HF, the electrochemical etching process can be performed in a reactor or a cell comprising an HF-resistant material. Examples of HF-resistant materials include fluoropolymers, such as polytetrapfruoroethylene. In some embodiments, the electrochemical etching can be performed by monitoring a current at one of the electrodes, e.g. by monitoring anodic current, (galvanostatically) or voltage (potentiostatically). In some embodiments, the method can be performed by electrochemical etching at a constant current density, which can allow for a better control of the formed porous layer properties and/or for a better reproducibility from sample to sample.

In some embodiments, if the formation of two different stable porous regions is desired, two different constant currents can be applied. For example, a first current density can be applied to form a first stable porous layer and then a second current density can be applied to form a second stable porous layer, which can differ from the first stable porous layer in a pore size and/or porosity.

In some embodiments, parameters of the formed porous layer, such as pore size, porosity, thickness, pore profile and/or pore shape, and thus the respective parameters of the fabricated particles can be tuned by selecting parameters of the electrochemical etching process, such as a concentration and a composition of the etching solution, applied electrical current (and potential), etching time, temperature, stirring conditions, presence and absence of illumination (and parameters of illumination, such as intensity and wavelength) as well as parameters the etched substrate, such as the substrate's composition, the substrate's resistivity, the substrate's crystallographic orientation and the substrate's level and type of doping.

In some embodiments, along the pores in the formed porous layer can have a predetermined longitudinal profile, which is a profile perpendicular or substantially perpendicular to the surface of the substrate. Such longitudinal profile may be generated by varying the electrical current density during the electrochemical etching. For longitudinal pores in the porous layer, both porosity and pore size may be varied. Accordingly, in some embodiments, a profiled pore in the porous layer and in the fabricated porous particles may have a smaller size at top, i.e. at the surface of the substrate, and a larger pore at bottom, i.e. deeper in the substrate. In certain embodiments, a profiled pore in the porous layer and in the fabricated porous particles may have a larger size at the top, and a small size at the bottom. In some embodiments, profiled pores in the porous layer and in the fabricated particles may also have different porosity at the top and at the bottom.

In some embodiments, the electrochemical etching may start with a pulse of a larger electrical current for a short time to prevent or reduce the formation of a nucleation layer. The nucleation layer may be also removed by etching the nucleation layer after the formation of the porous layer. Such etching may be performed by dry etching technique, such as reactive ion etching (RIE). In certain embodiments, an appropriate measure may be taken to protect the areas underneath. For example, a photoresist may be placed on the surface, and planation may be performed by baking, and then plasma etch-back may be applied to expose a portion of the surface of the substrate that is to be etched.

For electrochemical etching, a backside of the substrate, i.e. the side of the substrate opposite to the one of which the porous layer is formed, can be coated with a conductive layer, such as a metal layer, to ensure electrical contact. Such a conductive layer can be coated using a number of techniques, including thermal evaporation and sputtering.

In some embodiments, during the electrochemical etching, the etching solution can start its pore formation through a formation of a nucleation layer, which is a surface layer of the substrate and in which pores have properties different from the desired properties of the porous layer. In some embodiments, the nucleation layer may be characterized by irregularities of its pore properties and associated surfaces roughness, which may on a scale larger than a pore size.

In some applications, the nucleation layer on the surface of porous particles is undesirable. For example, when the silicon porous particles are used for loading smaller size particles inside them, the nucleation layer on the surface of the larger may reduce loading efficiency.

In some embodiments, a nucleation layer is removed or prevented from forming. In some embodiments, during the electrochemical etching, prior to applying a current to produce the desired pores in the porous layer, a larger current may be applied to prevent the formation of the nucleation layer. Yet in some embodiments, after the formation of the porous layer, the nucleation layer may be removed by dry etching, such as reactive ion etching (RIE).

In some embodiments, patterning the one or more particles on a surface of the substrate may be performed using any of a number of techniques. In some embodiments, the patterning may be performed using a lithographic technique, such as photolithography, X-ray lithography, deep UV lithography, nanoimprint lithography or dip-pen lithography. The photolithographic technique can be, for example, contact aligner lithography, scanner lithography, or immersion lens lithography. In some embodiments, using a different mask, in case of photolithography, or mold, it may be possible to design particles having a number of predetermined regular, i.e. non-random shapes, such as spherical shape, square, rectangular, ellipse, disk and semi-spherical shapes. In some embodiments, patterning may be used to define lateral shape and dimensions of the particle, i.e. shape and dimensions of the particle in the cross section parallel to the surface of the substrate. In some embodiments, when the formation of a porous layer precedes the patterning, the lateral dimensions of the fabricated particles are substantially the same as the lateral dimensions of the patterned features. In some embodiments, when the patterning precedes the formation of a porous layer, the lateral dimensions of the fabricated particles may be larger than the lateral dimensions of the patterned features. In some embodiments, patterning allows one to produce particles having a predetermined regular, i.e. non-random, lateral shape. For example, in photolithographic patterning, masks of various shapes may be used to produce a desired predetermined shape, while in nano-imprint lithography, molds or stamps of various shape may be used for the same purpose. In some embodiments, the predetermined non-random lateral shapes for the particles are not particularly limited. For example, the particles can have circular, square, polygonal and elliptical shapes. In some embodiments, the microparticles can be configured into a shape selected from the group consisting of discoidal, spheroid, non-spheroid, oblate spheroid, and combinations thereof. In some embodiments, the microparticles are fabricated of a porous or mesoporous silicon material that is discoidal in shape.

In some embodiments, the particles can be released from the wafer after the patterning and porous layer formation steps via electropolishing, which can involve applying a sufficiently large electrical current density to the wafer. In some embodiments, the releasing of the particles from the wafer can involve a formation of an additional porous layer, which has a larger porosity than the already formed porous layer. In some embodiments, this higher porosity layer will be referred to as a release layer. In some embodiments, the release layer can have a porosity large enough so that it can be easily broken when desired using, for example, mechanical techniques, such as exposing the substrate to ultrasonic energy. At the same time, the release layer can be strong enough to hold the earlier formed porous layer intact with the substrate.

Any of a number of techniques may be used to modify surface properties of the particles, i.e. surface properties of particle's outside surface, and/or surface properties of particle's pores. In some embodiments, surface modification of fabricated particles can be performed while the particles are still intact with the substrate, before the particles are released. In some embodiments, the types of surface modification for the particles can include, but are not limited to, chemical modification including polymer modification and oxidation; plasma treatment; metal or metal ion coating; chemical vapor deposition (CVD) coating, atomic layer deposition (ALD); evaporation and sputtered films, and ion implantation. In some embodiments, the surface treatment is biological for biomedical targeting and controlled degradation.

Because the surface modification of the particles can be performed before the particles are released from the substrates, in some embodiments, asymmetrical surface modification is also possible. In some embodiments, the asymmetric surface modification provides a surface modification on one side of the particle is different than that on the other side of the particle. For example, one side of the surface of the particle can be modified, while the other side of the surface of the particle can remain unmodified. For instance, pores of the particles can be fully or partially filled with a sacrificial material, such as a sacrificial photoresist. Thus, only the outer surface of the particles is being treated during the surface modification. After selective removal of the sacrificial material, only the outer surface of the particles is modified, i.e. the pore surface of the particles remains unmodified. In some embodiments, the outer surface can be patterned by, for example, photolithography, so that one part of the outer surface can have one modification, while another part of the outer surface can have another modification. In some embodiments, surface modification of particles is performed by techniques including but not limited to oxidation, silanization and attaching targeting moieties, such as antibodies and combination thereof.

In some embodiments, the maximum characteristic size of the particle can be less than about 100 microns or less than about 50 microns or less than about 20 microns or less than about 10 microns or less than about 5 microns or less than about 4 microns or less than about 3 microns or less than about 2 microns or less than about 1 micron. In some embodiments, the maximum characteristic size of the particle can be from 500 nm to 3 microns or from 700 nm to 2 microns. In some embodiments, the maximum characteristic size of the particle can be greater than about 2 microns or greater than about 5 microns or greater than about 10 microns.

In some embodiments, microparticles have an average pore size of no more than 1 micron or no more than 800 nm; or more than 500 nm or more than 300 nm or no more than 200 nm or no more than 100 nm; or no more than 80 nm or no more than 50 nm. In certain embodiments, microparticles can have their respective average pore size of no more than 1 micron or no more than 800 nm or more than 500 nm or more than 300 nm or no more than 200 nm or no more than 100 nm or no more than 80 nm or no more than 50 nm. In some embodiments, microparticles can have an average pore size from about 10 to about 60 nm or from about 20 to about 40 nm.

In some embodiments, the therapeutic microparticles have a longest dimension of about 1,700 nm to about 3,000 nm, a shortest dimension of about 100 nm to about 200 nm, or a combination thereof. In some embodiments, the therapeutic microparticles have a longest dimension of about 1,900 nm to about 2800 nm, a shortest dimension of about 120 nm to about 170 nm, or a combination thereof.

In some embodiments, the therapeutic microparticles have a discoidal shape having a diameter of from about 900 nm to about 2,800 nm and a thickness of from about 200 nm to about 800 nm. In some embodiments, the therapeutic microparticles have a discoidal shape having diameter of from about 1000 nm to about 2,500 nm, including from about 1200 nm to about 2,200 nm; or from about 1400 nm to about 1,900 nm. In some embodiments, the therapeutic microparticles have a discoidal shape having thickness of from about 250 nm to about 700 nm, including from about 300 nm to about 600 nm or from about 350 nm to about 500 nm. A benefit of therapeutic microparticles having a discoidal shape can be that the shapes do not have sharp edges that could damage the circulatory system of a subject. A benefit of therapeutic particles having a diameter of less than 2,800 nm can be that the particles are less likely to clog the arteries, veins and capillaries of a subject.

In an embodiment, the therapeutic microparticles are porous silicon microparticles containing a polymer of L glutamic acid conjugated with doxorubicin, the polymer having a weight average molecular weight of from about 50 kDa to about 100 kDA, including from about 70 kDa to about 80 kDa.

An example of the therapeutic microparticles that can be used in the formulations of the present disclosure is disclosed in U.S. Ser. No. 10/253,424B2, which is incorporated by reference in its entirety.

siRNA oligonucleotides have been delivered to target cells using conventional delivery vehicles, such as liposomes. Most siRNA products in current clinical trials are packaged either in liposomes or in lipid nanoparticles. The disease indications are liver-related metabolic diseases, liver cancer, or other cancer types that have metastasized to the liver (Fitzgerald et al., "Effect of an RNA interference drug on the synthesis of proprotein convertase . . . . Phase 1 trial," *Lancet*, 383:60-68 (2014)). The multistage vector (MSV)

delivery system has been designed to maximize delivery of therapeutic agents to tumor cells through sequential negotiation of various biological barriers (Ferrari, M et al., "Vectoring siRNA therapeutics into the clinic," Nat. Rev. Clin. Oncol., 7(9):485-486 (2010)). The system consists of a first-stage, nanoporous silicon microparticle and a second-stage, liposomal particle, which is loaded into the nanopores of the first-stage microparticle. For delivery of gene silencing agents, double-stranded RNA molecules are packaged into 30- to 40-nm liposomes that are then loaded into the 60- to 80-nm pores of the nanoporous silicon microparticle (Shen, H et al., "Delivery of gene silencing agents for breast cancer therapy," Breast Cancer Res., 15(3):205 (2013a); Tanaka, T et al., "Sustained small interfering RNA delivery by mesoporous silicon particles," Cancer Res., 70(9):3687-3696 (2009)). Once inside the bloodstream, the first-stage microparticles travel with the blood flow and settle at tumor vasculature, where the liposomal siRNAs are released therefrom. The rate of siRNA release is determined by the diameter of the nanopores, the size of the liposome, and the rate of silicon degradation.

In a typical MSV approach, charged nanoliposomes packaged with small-molecule drugs or therapeutic siRNAs are loaded into the pore interior of the pSi particles via electrostatic interaction and capillary force. Once inside the body, the pSi particles (i.e., the "Stage 1" particles) are gradually degraded, and the nanoliposomes (i.e., the "Stage 2" particles contained therein) are released from the Stage 1 pSi particles, thus facilitating a multi-stage release. This delivery system has advantages of both enhanced loading efficiency and an easy tunability with respect to particle shape and size, which allows for efficient encapsulation of nano-sized species into the MSV. This shields them from contact with unintended organs or cells, and, thus leads to minimal toxicity and enhanced efficacy. A multistage-vector platform to deliver siRNAs to other tissues for cancer treatment has been previously reported. See, for example, Shen, H et al., "Delivery of gene silencing agents for breast cancer therapy," Breast Cancer Res., 15(3):205 (2013a) and Shen, H et al., "Enhancing chemotherapy response with sustained EphA2 silencing using multistage vector delivery," Clin. Cancer Res., 19(7):1806-1815 (2013b).

Another example of the therapeutic microparticles that can be used in the formulations of the present disclosure is disclosed in US 2016/0369269 A1 i.e. polycation-functionalized nanoporous silicon (PCPS) particles that includes: (a) a population of polycation-functionalized nanoporous silicon first-stage particles, and (b) a population of second-stage particles contained substantially within the interior of the population of the first-stage particles, the second-stage particles comprising at least one active agent. These polycation-functionalized nanoporous silicon particles are able to overcome at least one biological barrier, including one or more biological barriers selected from the group consisting of a hemo-rheology barrier, a reticulo-endothelial barrier, a blood-brain barrier, a tumor-associated osmotic interstitial pressure barrier, an ionic- or a molecular-pump barrier, a cell-membrane barrier, an enzymatic-degradation barrier, a nuclear membrane barrier, and combinations thereof. In US 2016/0369269 A1, it was demonstrated that they can load a lot more siRNA into the same amount of porous silicon particles (up to 100-fold more nucleic acids) since the siRNA molecules is not pre-packaged into nanoparticles, and thereby reducing the total amount of porous silicon for each treatment. Less silicon translates to less toxicity. Moreover, the loaded PCPS particles can be dried down, and stored/transported over periods of several days to several weeks without a significant loss in activity or efficacy.

In some embodiments, the therapeutic microparticles can have at least one targeting moiety on its surface specifically directed against a target cell. In some embodiments, the at least one targeting moiety is selected from the group consisting of ligands, antibodies, antibody fragments, peptides, aptamers, small molecules, and combinations thereof. For example, ligands can be chemically linked to appropriate reactive groups on the surface of the particle. Protein ligands can be linked to amino- and thiol-reactive groups under conditions effective to form thioether or amide bonds respectively. Methods of attaching antibody or other polymer-binding agents to an inorganic or polymeric support are detailed elsewhere.

In some embodiments, the therapeutic microparticles can also further optionally include one or more additional components to aid, facilitate, or improve delivery of a pro-drug and/or an active metabolite contained therein, including, without limitation, one or more liposomes, lipid particles, lipid complexes, and can further optionally include one or more binding agents, cell surface active agents, surfactants, lipid complexes, niosomes, ethosomes, transferosomes, phospholipids, sphingolipids, sphingosomes, or any combination thereof.

In an embodiment, the formulation contains from about 0.5 billion therapeutic microparticles per milliliter of the formulation to about 3.0 billion therapeutic microparticles per milliliter of the formulation. In some embodiments, the formulation contains from about 1.0 billion therapeutic microparticles per milliliter of the formulation to about 2.5 billion therapeutic microparticles per milliliter, including from about 1.2 billion therapeutic microparticles per milliliter to about 2.2 billion therapeutic microparticles per milliliter or from about 1.4 billion therapeutic microparticles per milliliter to about 2.2 billion therapeutic microparticles. In an embodiment, the formulation contains from about 0.5 billion therapeutic microparticles per milliliter of the formulation to about 1.5 billion therapeutic microparticles per milliliter of the formulation. A benefit of a therapeutic microparticle concentration of than 3 billion, or less, therapeutic micro particles per milliliter of embodiments of the formulation disclosed herein can be at the formulation is able to keep the therapeutic microparticles suspended for at least an hour. In general, the higher the concentration the more difficult the suspension is to maintain. A benefit of a therapeutic microparticle concentration of 0.5 or more therapeutic microparticles per milliliter of the formulation can be and ability to provide higher doses for greater efficacy in a subject. It has been found that when the therapeutic microparticle concentration exceeds 3.0 billion per milliliter of the formulation then the microparticles tend to fall out of solution too quickly to be used in IV therapy.

In some embodiments, the present disclosure further provides a method of preparing a formulation for intravenous injection. In some embodiments, includes: forming the formulation by adding sodium carboxymethyl cellulose, a poly(ethylene glycol)-block-poly(propylene glycol)-block-poly(ethylene glycol), and mannitol to water, simultaneously or in any order. In some embodiments, the method includes adding about 0.80 weight percent to about 1.60 weight percent sodium carboxymethyl cellulose based on a total weight of the formulation. In some embodiments, the method includes adding from about 0.12 weight percent to about 0.28 weight percent of the poly(ethylene glycol)-block-poly(propylene glycol)-block-poly(ethylene glycol) based on the total weight of the formulation. In some embodiments, the method includes adding from about 0.22 weight percent to about 0.78 weight percent of mannitol based on the total weight of the formulation.

In some embodiments, the method further comprises: forming a pharmaceutical formulation by adding therapeutic microparticles to the formulation. In some embodiments, the method, the therapeutic microparticles including porous silicon microparticles containing polymeric doxorubicin or porous silicon microparticles containing siRNA.

In some embodiments, the method further comprises: forming a pharmaceutical formulation by adding therapeutic microparticles to the formulation. In some embodiments of the method, the therapeutic microparticles include porous silicon microparticles containing an active agent, a polymeric active agent conjugate, or a combination thereof. In some embodiments of the method, the polymer active agent conjugate can include a polymeric carrier conjugated to the active agent.

In some embodiments, the method further comprises: forming a pharmaceutical formulation by adding therapeutic microparticles to the formulation. In some embodiments of the method, the therapeutic microparticles are porous silicon microparticles containing a polymer of L glutamic acid conjugated with doxorubicin. In some embodiments of the method, the polymer has a weight average molecular weight of from about 50 kDa to about 100 kDA, including from about 70 kDa to about 80 kDa.

In some embodiments, the polymeric carrier comprises poly-L-glutamic acid, poly(lactic acid), poly(glycolic acid), poly(D-lactic-co-glycolic acid), poly(L-lactic-co-glycolic acid), poly(D,L-lactic-co-glycolic acid), poly(caprolactone), poly(valerolactone), poly(hydroxybutyrate), poly(hydrovalerate), polydioxnanone, or combinations thereof.

In some embodiments, the active agent includes a drug, a biologically active compound, a chemotherapeutic agent, an immunosuppressive agent, a cytokine, a cytotoxic agent, a nucleolytic compound, a contrast agent, a pro-drug enzyme, a gene, a nucleic acid, a shRNA, a siRNA, a DNA fragment, a RNA fragment, a plasmid, or any combinations thereof.

In some embodiments, the method further comprises: forming a pharmaceutical formulation by adding therapeutic microparticles to the formulation before, during, or after, adding the sodium carboxymethyl cellulose, the poly(ethylene glycol)-block-poly(propylene glycol)-block-poly(ethylene glycol), or the mannitol to water.

In some embodiments, the method further comprises: forming a suspension of the therapeutic microparticles. In some embodiments, the method further comprises: before forming a pharmaceutical formulation by adding therapeutic microparticles to the formulation, the therapeutic microparticles being porous silicon microparticles containing the polymer of L-glutamic acid conjugated with doxorubicin, forming a suspension of the therapeutic microparticles. In some embodiments, the suspension of the therapeutic microparticles are formed by: forming a doxorubicin solution by dissolving poly(L-glutamic acid) polymer conjugated with doxorubicin in a liquid, wherein the liquid contains from about 50 weight percent to 100 weight percent methanol based on a total weight of the doxorubicin solution, including from about 70 weight percent to 99 weight percent methanol, including from about 80 weight percent to 95 weight percent methanol; and then forming therapeutic microparticles by contacting porous silicon microparticles with the doxorubicin solution. A benefit of forming therapeutic microparticles by contacting porous silicon microparticles with the doxorubicin solution in a liquid containing from about 50 weight percent to 100 weight percent methanol can be the ability of this liquid to suspend the microparticles without inadvertently degrading the poly(L-glutamic acid) polymer conjugated with doxorubicin.

In an embodiment, after forming the suspension of pharmaceutical particles, and before forming the pharmaceutical formulation, a supernatant is removed by applying centrifugal force to the doxorubicin solution and separating the supernatant from a volume of the doxorubicin solution. In some embodiments, after forming the suspension of pharmaceutical particles, and before forming the pharmaceutical formulation, the doxorubicin solution is agitated by applying vibrations, ultrasonic sound, or a combination thereof.

The present disclosure further provides a method of administering a therapeutic microparticle to a subject in need thereof. In some embodiments, the method of administering the therapeutic microparticle to the subject includes providing a pharmaceutical formulation, wherein the pharmaceutical formulation contains from about 0.80 weight percent to about 1.60 weight percent sodium carboxymethyl cellulose based on a total weight of the formulation, from about 0.12 weight percent to about 0.28 weight percent of a poly(ethylene glycol)-block-poly(propylene glycol)-block-poly(ethylene glycol) based on the total weight of the formulation, from about 0.22 weight percent to about 0.78 weight percent of mannitol based on the total weight of the formulation, therapeutic microparticles, and water. In some embodiments, the method of administering the therapeutic microparticle to the subject further includes adding the pharmaceutical formulation into an intravenous vessel and connecting the intravenous vessel to the subject.

In some embodiments, the therapeutic microparticles include an active agent, a polymeric active agent conjugate, or a combination thereof, the polymer active agent conjugate including a polymeric carrier conjugated to the active agent.

In an embodiment, the formulation contains from about 0.5 billion therapeutic microparticles per milliliter of the formulation to about 3.0 billion therapeutic microparticles per milliliter of the formulation. In some embodiments, the formulation contains from about 1.0 billion therapeutic microparticles per milliliter of the formulation to about 2.5 billion therapeutic microparticles per milliliter of the formulation, including from about 1.2 billion therapeutic microparticles per milliliter to about 2.2 billion therapeutic microparticles per milliliter, or from about 1.4 billion therapeutic microparticles per milliliter to about 2.2 billion therapeutic microparticles per milliliter of the formulation. In certain embodiments, the formulation contains from about 0.5 billion therapeutic microparticles per milliliter of the formulation to about 1.5 billion therapeutic microparticles per milliliter of the formulation.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may vary.

Therapeutic Microparticles
Synthesizing pDox

Generally, synthesis of poly(L-glutamic acid) polymer conjugated with doxorubicin (pDox) can be prepared in accordance with the method described in (Xu et al., "An injectable nanoparticle generator enhances delivery of cancer therapeutics," Nature Biotechnology, 34, 414-418 (2016)).

For example, hydrazide groups are conjugated to glutamic acid side chains of poly(L-glutamic acid) by means of an acid anhydride reaction for pDox synthesis. N-morphylmorline is added to poly(1-glutamic acid) in anhydrous dimethylformamide (DMF), followed by dropwise addition of isobutyl chloroformate at 4° C. under Argon gas. After stirring for 15 min, carbazic acid tert-butyl ester in DMF is added. The resulting solution is allowed to react for 30 min at 4° C. followed by 2 h at 25° C. To obtain poly(1-glutamic acid hydrazide)-co-poly(1-glutamic acid), the resulted product is stirred with TFA (trifluoroacetic acid) for 1 hour at room temperature.

About, 100 mg poly(1-glutamic acid hydrazide)-co-poly (1-glutamic acid) is dissolved in 200 ml anhydrous methanol or DMSO (dimethyl sulfoxide), and 100 µL of trifluoroacetic acid is added. Doxorubicin hydrochloride is then added, and the mixture is stirred at 25° C. for 48 h under Argon gas. The pDox is concentrated, dialyzed in methanol, and purified with SEPHADEX©-LH20 (AMERSHAM® Pharmacia Biotech Co.).

Alternatively, the conjugation of tert-butyl carbazate with poly(1-glutamic acid) can be prepared by using HBTU/ HOBt as a coupling reagent, rather than a mixed anhydride coupling reaction. For example, 2 gram of Poly-L-glutamic acid is added to 100 mL of dry DMF (Dimethylformide) in 250 mL flask, heated and stirred to clear solution, and then cooled to room temperature. 960 mg of HBTU (N,N,N',N'-Tetramethyl-O-(1H-benzotriazol-1-yl)uronium hexafluorophosphate, CAS, 94790-37-1), 380 mg of HOBt (Hydroxybenzotriazole, CAS, 123333-53-9) and 336 mg of tert-butyl carbazate (CAS, 870-46-2) and 800 µl of N,N-diisopropylethylamine are added sequentially. The reaction is stirred for 24 h at room temperature under argon.

Synthesis of Porous Silicon Microparticles

Synthesis of porous silicon microparticles (Injectable Nanoparticle Generator, iNPG) and chemical surface modification thereof is described herein. Porous silicon microparticles are synthesized in accordance with the method described in (Xu et al., "An injectable nanoparticle generator enhances delivery of cancer therapeutics," Nature Biotechnology, 34, 414-418(2016)).

For example, a heavily doped p++ type (100) silicon wafers with resistivity of 0.005 ohm-cm (Silicon Quest, Inc, Santa Clara, CA) are used as the silicon substrate. A 400 nm porosity layer is formed by applying a 7 mA/cm$^{-1}$ current for 125 minutes in a 1:3 HF (49%):ethanol solution. The electrical current is then increased to 76 mA/cm and applied for 8 minutes forming a high porosity release layer. A 40 nm $SiO_2$ layer is deposited by low pressure chemical vapor deposition at 400° C. Standard photolithography is used to pattern a 2.6 m circular pattern with 3.4 m pitch over the $SiO_2$ capped porous layer using a contact aligner (KARL SUSS® MA6 mask aligner) and NR9-500P photoresist (FUTURREX® Franklin, NJ, USA). The pattern is transferred into the porous double layer by dry etch in $CF_4$ plasma (PLASMATHERM® 790, 25 sccm $CF_4$, 100 mTorr, 200 W RF). The capping $SiO_2$ layer is removed in 49% HF, and the microparticles are released from the substrate by sonication in isopropanol. The microparticles are treated with $H_2O_2$ at 100° C. to oxidize the surface. Microparticles are then modified with 2% (v/v) 3-aminopropyltriethoxysilane (APTES) in isopropanol for 48 h at 55° C. to conjugate primary amines on the microparticles surface to obtain APTES-modified porous silicon microparticles. The microparticles are found to have a size of about 2.6 m with about 700 nm thickness, having pore size ranging from 40 nm to 80 nm.

Loading of pDox in Microparticles (iNPG) to Prepare pDox-iNPG iNPG-pDox microparticles are assembled by loading concentrated pDox molecules (>10 mg/ml in methanol) into the APTES-modified porous silicon microparticles followed by vacuum drying. The loading process is repeated to completely fill the nano-pores with pDox. There are challenges to preparing the therapeutic microparticles—iNPG-pDox. For example, iNPG-pDox is composed of discoidal porous silicon microparticles with a diameter of 2-3 micrometers (iNPG particle) and poly(L-glutamic acid) polymer conjugated with doxorubicin (pDox). pDox is loaded into nanopores of iNPG formulation to obtain the therapeutic microparticles (iNPG-pDox). However, iNPG particles tend to form aggregates in water or in a number of organic solvents such as dimethylformamide (DMF), which is one of the best solvents for pDox. When pDox in DMF is loaded into iNPG microparticles, some small and big aggregates are formed. This tends to limit the amount of pDox microparticles that can be loaded in iNPG formulation without causing any aggregation.

A series of experiments are performed to discover (i) a solvent for dissolve pDox and (ii) an acceptable pDox-to-iNPG ratio to avoid any aggregation or settlement. It is found that methanol is a suitable organic solvent to dissolve pDox and suspend iNPG microparticles. In addition, an acceptable pDox to iNPG ratio is found to be less than 1.6 mg of pDox/billion iNPG. If the pDox to iNPG ratio exceeds 1.6 mg of pDox/billion iNPG, then the particles precipitate and results in the formation of large aggregates.

Formulations

Various formulations were prepared by using varying amounts of Sodium carboxymethyl cellulose, Mannitol and Poloxamer 188. Details of the experimental protocol including amounts of each of the ingredients are provided in Table 1 below.

TABLE 1

Experimental Protocol

| Variables | Ingredients (in wt. % per a total weight of formulation) | Code | | |
|---|---|---|---|---|
| | | −1 | 0 | 1 |
| A | Sodium carboxymethyl cellulose, CMC-Na | 1.7 | 1.2 | 0.7 |
| B | Mannitol | 0.8 | 0.5 | 0.2 |
| C | Poloxamer 188 | 0.3 | 0.2 | 0.1 |

In Table 1, a '−1' indicates that the formulation contains 1.7 weight % of ingredient A (CMC-Na) based on a total weight of the formulation. Similarly, a '0' indicates that the formulation contains 1.2 wt % of CMC-Na and a '1' indicates 0.7 wt % CMC-Na, based on based on a total weight of the formulation, respectively. Each formulation has about 2 billion therapeutic microparticles per mL.

All the ingredients in the preparation of formulations are weighed accurately as per Table 1 provided herein-above and added into the water in different combinations (as per Table 2, provided herein-below), and mixed thoroughly to obtain the formulations for intravenous injection.

Therapeutic microparticles—iNPG-pDox (can be prepared in examples above) are added to prepare the formulations such that each of the formulations has about 2 billion therapeutic microparticles per mL of the formulation. Each of the formulations are then tested for suspension of microparticles.

Table 2 below illustrates the effect of variation in amounts of each of the ingredients of the formulation on the suspension time of iNPG-pDox microparticles in formulation, i.e. the duration that the iNPG-pDox microparticles remain suspended in the formulation.

TABLE 2

Effect of variation in amounts of ingredients of the formulation on suspension time of iNPG-pDox microparticles.

| Run Order | A | B | C | Suspension time (in minutes) |
|---|---|---|---|---|
| 1. | 0 | 0 | 0 | 105 |
| 2. | −1 | 1 | 0 | 30 |
| 3. | −1 | −1 | 0 | 5 |
| 4. | 1 | 0 | −1 | 90 |
| 5. | −1 | 0 | 1 | 15 |
| 6. | 0 | 1 | −1 | 90 |
| 7. | 0 | −1 | −1 | 75 |
| 8. | 1 | 1 | 0 | 75 |
| 9. | 1 | 0 | 1 | 90 |
| 10. | 1 | −1 | 0 | 75 |
| 11. | 0 | 1 | 1 | 90 |
| 12. | 0 | 0 | 0 | 105 |
| 13. | 0 | −1 | 1 | 75 |
| 14. | −1 | 0 | −1 | 15 |
| 15. | 0 | 0 | 0 | 105 |

As can be seen from Table 2, iNPG-pDox (therapeutic microparticles) remain uniformly suspended for about 105 minutes in the formulation containing 1.2% CMC-Na, 0.2% poloxamer 188, and 0.5% mannitol.

To assess the effect of varying concentrations of iNPG-pDox on the suspension time of iNPG-pDox microparticles, formulations are prepared using 1.2% CMC-Na, 0.2% poloxamer 188, and 0.5% mannitol with varying amounts of iNPG-pDox microparticles. Results of the study are provided in Table 3 herein-below.

TABLE 3

Effect of concentration of iNPG-pDox therapeutic microparticles on suspension time in formulation

| No. of iNPG-pDox microparticles/ml of the formulation | Suspension time (in hours) | | | | | |
|---|---|---|---|---|---|---|
| | 1.0 | 1.5 | 2.0 | 2.5 | 3.0 | 3.5 |
| 0.5 Billion | ✓ | ✓ | ✓ | ✓ | ✓ | x |
| 1.0 Billion | ✓ | ✓ | ✓ | ✓ | x | x |
| 1.5 Billion | ✓ | ✓ | ✓ | ✓ | x | x |
| 2.0 Billion | ✓ | ✓ | ✓ | x | x | x |
| 2.5 Billion | ✓ | x | x | x | x | x |
| 3.0 Billion | ✓ | ✓ | x | x | x | x |
| 3.5 Billion | ✓ | x | x | x | x | x |
| 4.0 Billion | ✓ | x | x | x | x | x |

In Table 3, an 'x' indicates that the particles settled, whereas a "check" mark indicates that the particles remained suspended. As can be seen from Table 3, even when the formulation contained about 2.0 billion iNPG-pDox therapeutic microparticles, the formulation was able to maintain the iNPG-pDox therapeutic microparticles in suspended form for about 2 hours. When the formulation contained lower concentration of iNPG-pDox therapeutic microparticles (0.5 billion), the formulation was able to maintain the iNPG-pDox therapeutic microparticles in suspended form for almost about 3 hours.

Effect of Rotation on the Suspension Time of iNPG-pDOX Microparticles

Could the suspension of therapeutic microparticles be extended beyond 3 hours?

To further understand the effect of agitation or rotation on the suspension time of iNPG-pDOX microparticles in the formulation, the formulations described above (having 0.5-3 billion iNPG-pDOX microparticles) are subjected to rotation at 25 RPM. The results are shown in FIG. 1. As can be seen from FIGS. 1A-1D, keeping the formulation on a rotator can improve the suspension time, inasmuch as, in the formulation containing higher concentration of iNPG-pDox therapeutic microparticles (i.e. 3.0 billion particles/mL of formulation), the microparticles remained fully suspended for about 2.5 hours.

Comparison of the Suspension Time of Therapeutic Microparticles (MSV/siRNA) in Present Formulation and Water Do the formulations herein only work for pDox loaded therapeutic microparticles or will formulation suspend other therapeutic microparticles with a different active agent?

Figure 2:
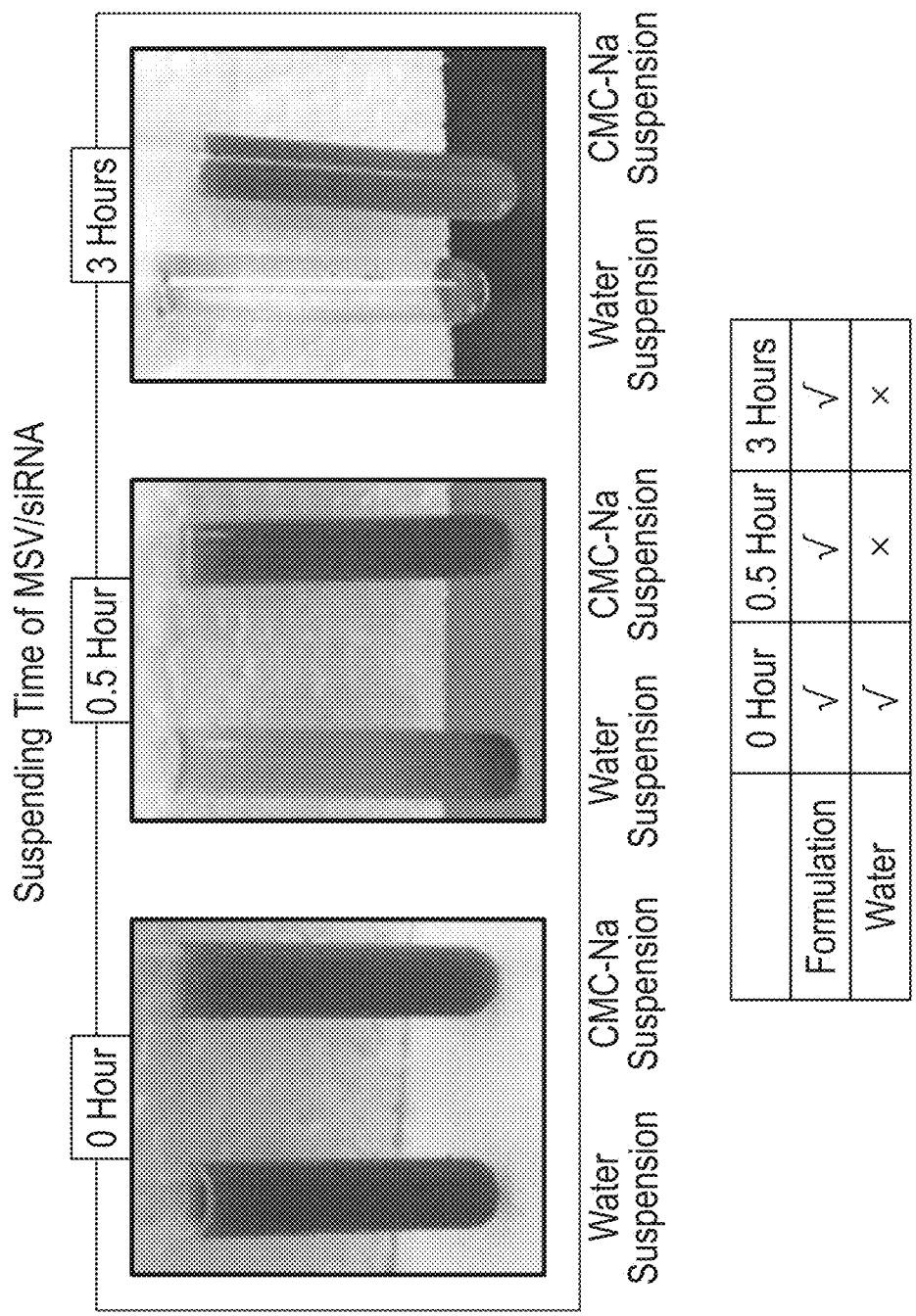
FIG. 2 is a picture showing a comparison of the suspension time of therapeutic microparticles (MSV/siRNA) in an embodiment of a formulation of present disclosure against water.

MSV/siRNA (Multistage Vectored siRNA), a different active agent, is suspended by using formulation comprising 1.2% CMC-Na, 0.2% poloxamer 188, and 0.5% mannitol. FIG. 2 shows a comparison of the suspension time of therapeutic microparticles (MSV/siRNA) in the present formulation against a control of water. As can be seen in FIG. 2, MSV/siRNA microparticles remain suspended in the formulation for up to 3 hours, whereas, in water, MSV/siRNA microparticles settle within 30 minutes.

The aforesaid studies establish that the formulation of the present disclosure affords suspension of therapeutic microparticles in the formulation long enough to be administered to a subject in need by intravenous injection.

Without further elaboration, it is believed that one skilled in the art can, using the description herein, utilize the present invention to its fullest extent. The embodiments described herein are to be construed as illustrative and not as constraining the remainder of the disclosure in any way whatsoever. While some embodiments of the invention may be shown and described, many variations and modifications thereof can be made by one skilled in the art.

What is claimed is:

1. A formulation for intravenous injection comprising:
   therapeutic microparticles, wherein the therapeutic microparticles are porous silicon microparticles containing a polymer of L-glutamic acid conjugated with doxorubicin, wherein the polymer has a weight average molecular weight of 70-80 kDa,
   from about 0.80 weight percent to about 1.60 weight percent of sodium carboxymethyl cellulose based on a total weight of the formulation,
   from about 0.12 weight percent to about 0.28 weight percent of poly(ethylene glycol)-block-poly(propylene glycol)-block-poly(ethylene glycol) based on the total weight of the formulation,
   from about 0.22 weight percent to about 0.78 weight percent of mannitol based on the total weight of the formulation, and
   water.

2. A formulation for intravenous injection comprising:
therapeutic microparticles, wherein the therapeutic microparticles are porous silicon microparticles containing a polymer of L-glutamic acid conjugated with doxorubicin, wherein the polymer has a weight average molecular weight of 70-80 kDa,
from about 0.80 weight percent to about 1.60 weight percent of sodium carboxymethyl cellulose based on a total weight of the formulation,
from about 0.12 weight percent to about 0.28 weight percent of poly(ethylene glycol)-block-poly(propylene glycol)-block-poly(ethylene glycol) based on the total weight of the formulation,
from about 0.22 weight percent to about 0.78 weight percent of mannitol based on the total weight of the formulation,
and water, and
wherein the formulation maintains the therapeutic microparticles in suspended form for more than 90 minutes.

3. The formulation of claim 1, wherein the formulation contains from about 1.19 weight percent to about 1.54 weight percent of sodium carboxymethyl cellulose based on the total weight of the formulation; or
wherein the formulation contains from about 1.33 weight percent to about 1.47 weight percent of sodium carboxymethyl cellulose based on the total weight of the formulation.

4. The formulation of claim 1, wherein the formulation contains from about 0.19 weight percent to about 0.21 weight percent of poly(ethylene glycol)-block-poly(propylene glycol)-block-poly(ethylene glycol) based on the total weight of the formulation; or
wherein the poly(ethylene glycol)-block-poly(propylene glycol)-block-poly(ethylene glycol) has a weight average molecule weight of 8,400 Daltons; or
wherein the poly(ethylene glycol)-block-poly(propylene glycol)-block-poly(ethylene glycol) has a structure of Formula I

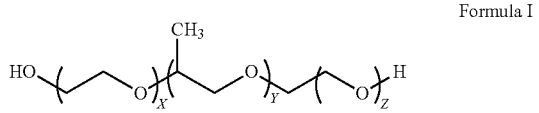

Formula I wherein X is from 72 to 88, Y is from 23 to 30, and Z is from 72 to 88.

5. The formulation of claim 1, wherein the formulation contains from about 0.48 weight percent to about 0.66 weight percent of mannitol based on the total weight of the formulation; or wherein the formulation contains from about 0.49 weight percent to about 0.63 weight percent of mannitol based on the total weight of the formulation.

6. The formulation of claim 1,
wherein the therapeutic microparticles have a longest dimension of about 1,700 nm to about 3,000 nm, a shortest dimension of about 100 nm to about 200 nm, or a combination thereof.

7. The formulation of claim 1,
wherein the therapeutic microparticles have a discoidal shape having a diameter of from about 900 nm to about 2,800 nm and a thickness of from about 200 nm to about 800 nm.

8. A method of preparing a pharmaceutical formulation for intravenous injection comprising:
forming the pharmaceutical formulation by adding therapeutic microparticles, sodium carboxymethyl cellulose, a poly(ethylene glycol)-block-poly(propylene glycol)-block-poly(ethylene glycol), and mannitol to water, simultaneously or in any order,
wherein the formulation contains from about 0.80 weight percent to about 1.60 weight percent sodium carboxymethyl cellulose based on a total weight of the formulation,
wherein the formulation contains from about 0.12 weight percent to about 0.28 weight percent of the poly(ethylene glycol)-block-poly(propylene glycol)-block-poly(ethylene glycol) based on the total weight of the formulation,
wherein the formulation contains from about 0.22 weight percent to about 0.78 weight percent of mannitol based on the total weight of the formulation, and
wherein the therapeutic microparticles are porous silicon microparticles containing a polymer of L-glutamic acid conjugated with doxorubicin, wherein the polymer has a weight average molecular weight of 70-80 kDa.

9. The method of claim 8, further comprising:
before forming the pharmaceutical formulation by adding therapeutic microparticles to the formulation, wherein the therapeutic microparticles are the porous silicon microparticles containing the polymer of L glutamic acid conjugated with doxorubicin,
forming a suspension of the therapeutic microparticles, wherein forming the suspension of the therapeutic microparticles comprises,
forming a doxorubicin solution by dissolving poly(L-glutamic acid) polymer conjugated with doxorubicin in a liquid, wherein the liquid contains from about 50 weight percent to 100 weight percent methanol based on a total weight of the doxorubicin solution, and
forming therapeutic microparticles by contacting porous silicon microparticles with the doxorubicin solution.

10. The method of claim 9, further comprising:
after forming the suspension of pharmaceutical particles and before forming the pharmaceutical formulation,
removing a supernatant by applying centrifugal force to the doxorubicin solution and separating the supernatant from a volume of the doxorubicin solution; or
after forming the suspension of pharmaceutical particles and before forming the pharmaceutical formulation, and
agitating the doxorubicin solution by applying vibrations, ultrasonic sound, or a combination thereof.

11. A method of administering a therapeutic microparticle to a subject in need thereof comprising:
providing a pharmaceutical formulation, wherein the pharmaceutical formulation contains
therapeutic microparticles, wherein the therapeutic microparticles are porous silicon microparticles containing a polymer of L glutamic acid conjugated with doxorubicin, wherein the polymer has a weight average molecular weight of 70-80 kDa,
from about 0.80 weight percent to about 1.60 weight percent sodium carboxymethyl cellulose based on a total weight of the formulation,
from about 0.12 weight percent to about 0.28 weight percent of a poly(ethylene glycol) block-poly(propylene glycol)-block-poly(ethylene glycol) based on the total weight of the formulation,
from about 0.22 weight percent to about 0.78 weight percent of mannitol based on the total weight of the formulation, and water;

adding the pharmaceutical formulation to an intravenous vessel, and connecting the intravenous vessel to the subject.

12. The method of claim 11, wherein the pharmaceutical formulation contains from about 0.5 billion therapeutic microparticles per milliliter to about 3.0 billion therapeutic microparticles per milliliter of the pharmaceutical formulation.

13. The formulation of claim 1, wherein the formulation maintains the therapeutic microparticles in suspended form for more than 90 minutes.

14. The formulation of claim 1, wherein the formulation contains from about 0.5 billion therapeutic microparticles per milliliter of the formulation to about 3.0 billion therapeutic microparticles per milliliter of the formulation; or wherein the formulation contains from about 1.0 billion therapeutic microparticles per milliliter of the formulation to about 2.5 billion therapeutic microparticles per milliliter of the formulation.

\* \* \* \* \*